Aug. 12, 1947. T. C. JONES 2,425,424
ELECTROLYTIC WATER PURIFIER
Filed Oct. 12, 1945
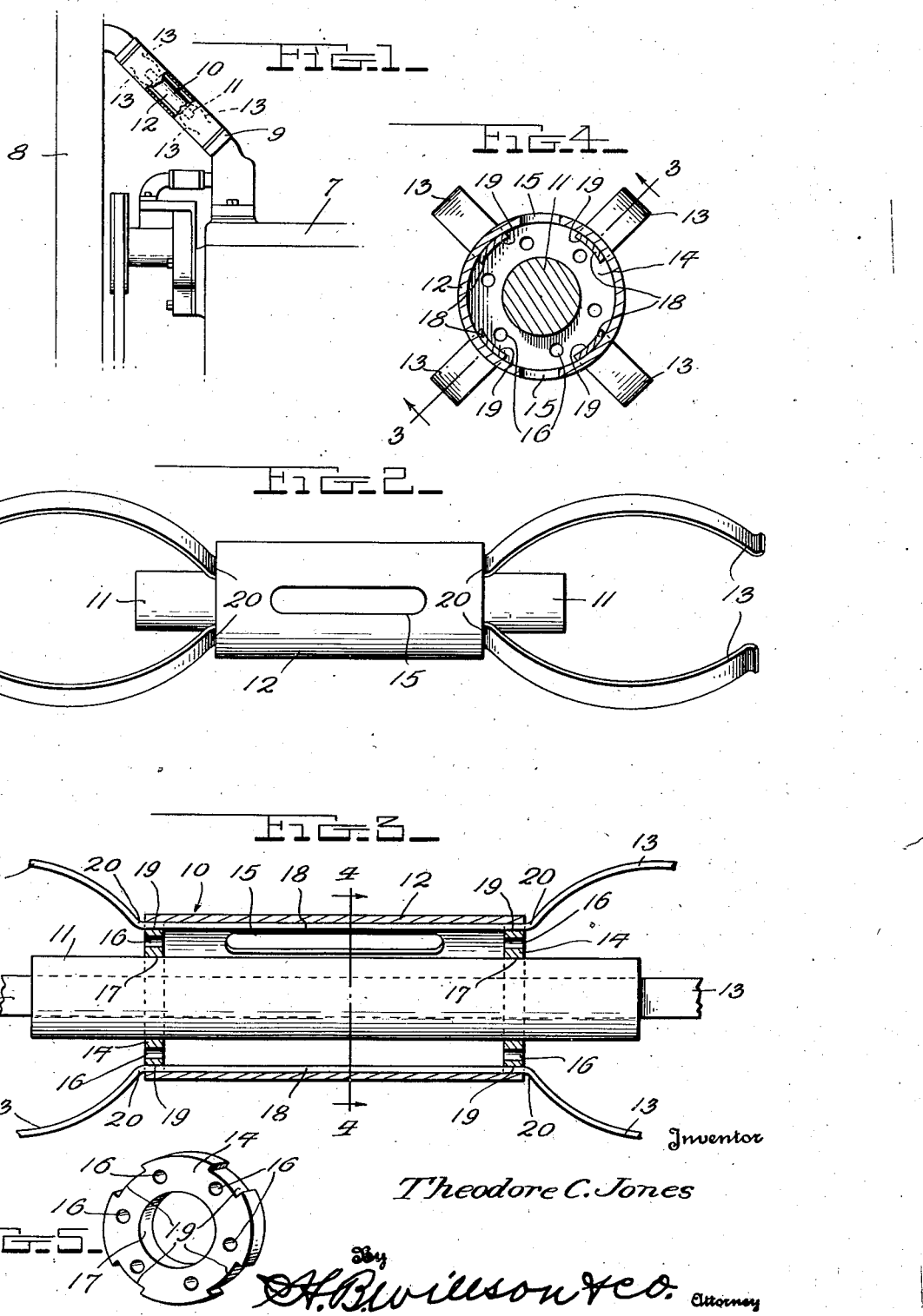
Inventor
Theodore C. Jones Patented Aug. 12, 1947

2,425,424

UNITED STATES PATENT OFFICE 2,425,424

ELECTROLYTIC WATER PURIFIER

Theodore C. Jones, Louisville, Ky.

Application October 12, 1945, Serial No. 621,911

6 Claims. (Cl. 204—248)

The invention relates generally to the art of water purification and more particularly to electrolytic devices used in hot water to prevent or retard the formation of rust, corrosion and scale.

One object of the invention is to provide a simple and effective device of this character for use in the water cooling system of an internal combustion engine.

Another object of the invention is to provide a device of this character which may be readily positioned in one of the hose connections of such a water cooling system, preferably the usual hose between the tops of the radiator and engine of an automobile, motor truck, or the like.

With the above and other objects in view, the invention resides in the novel subject matter hereinafter described and claimed, the description being accomplished by reference to the accompanying drawings.

Figure 1 is a side elevation of the upper parts of the radiator and engine of a motor vehicle showing the device in the hose between said parts, a portion of the hose being in section.

Figure 2 is a top plan view of the device.

Figure 3 is a longitudinal sectional view on the plane of line 3—3 of Fig. 4 on an enlarged scale.

Figure 4 is a transverse sectional view on the plane of line 4—4 of Fig. 3.

Figure 5 is a perspective view of one of the parts of the device.

In the drawing, Figure 1 is a diagrammatic side view of portions of a water-cooled internal combustion engine, the numeral 7 denoting the water jacketed engine, 8 the water cooling radiator and 9 the usual water hose connecting those parts, as in common practice on automobiles, motor trucks and other motor vehicles, as well as in stationary power plants of the internal combustion engine type. In said Fig. 1, I have shown my improved self-energizing electrolytic water correction device designated by the numeral 10 arranged in the tubular water passage formed by the hose 9, the latter being shown partly in section. It will be understood, however, that the device may be inserted in the usual hose connection between the lower parts of the radiator and engine and that it may be used in other tubular passages through which hot water or other liquid flows.

The device 10 is to be supported centrally in the passage and comprises a negative electrode 11, a positive electrode 12 and supporting means 13 which may form a part of the positive electrode. In the preferred construction illustrated, the negative electrode 11 is in the form of a straight cylindrical bar of electrolytic zinc containing 90% pure zinc, 9% aluminum and 1% mercury. It extends centrally through and beyond the ends of the positive electrode 12, the latter being in the form of an elongated hollow casing, preferably of cylindrical shape having open ends closed by discs 14. The cylinder 12 and its end members 14 are apertured to permit water to flow therethrough. Cylinder 12 is preferably formed with large slots 15 in its top and bottom while each of the discs 14 has an annular series of apertures 16 located between its periphery and a large central opening 17 through which the bar 11 extends as shown in Fig. 3. There is preferably a tight friction fit of bar 11 in openings 17 but other fastening means may be employed. The peripheries of discs 14 also preferably have a tight friction fit in the open ends of cylinder 12. The latter may be a piece of copper tubing and the discs 14 are also made of heavy copper plates, although other electropositive metals may be used for those parts. The supporting means 13 are preferably in the form of spring fingers that project from both ends of the device, an annular series being provided at each end. They are longitudinally curved and project outwardly or laterally beyond the outer surface of cylinder 12 to engage the inner wall of the hose or other tubular passage 9 to support the two electrodes centrally in the latter. These spring-supporting and spacing fingers may be formed by bending and shaping the ends of flat strips 18 of resilient sheet metal such as an alloy of copper and bronze. As shown in Figs. 3 and 4, straight portions of the strips extend through the cylinder 12 in contact with its inner surface and through notches 19 formed in the peripheral edges of the discs 14, the latter serving to hold the strips frictionally, although the bent portions 20 of the strips will prevent them from shifting longitudinally of the casing. It will be understood, however, that the strips and hence, the fingers may be otherwise secured to the device. By making the resilient supporting fingers 13 of copper and bronze, and arranging them as shown, they form a part of the positive electrode. I also preferably silver-plate the copper tube 12 and if desired the parts 13 and 14 may be similarly plated to increase the potential of the positive electrode.

The hot water circulated by the pump of the cooling system through the hose 9 causes the water to flow through and around the device. Because of the relatively positive and negative metals, a galvanic action is produced, the device being a short-circuited galvanic cell and impure water serving as the electrolyte. The mild electric current thus generated tends to prevent the formation of rust in the radiator and other parts of the cooling system and also retards corrosion and the formation of scale.

From the foregoing taken in connection with the accompanying drawings, it will be seen that novel and advantageous structure has been provided for carrying out the objects of the invention, and while preferences have been disclosed, attention is again invited to the possibility of making variations within the scope of the invention as claimed.

I claim:

1. A self-energizing, electrolytic water correction device comprising a tubular metal casing member constituting a positive electrode, end members secured to the ends of said tubular casing member, resilient strips extending longitudinally through said tubular casing member and secured between said end members and said casing member, and a negative electrode galvanically cooperable with said tubular casing member, said negative electrode extending longitudinally through said tubular casing member and being supported by said end members, the ends of said resilient strips projecting beyond said end members and constituting resilient supporting fingers for said device, at least one of the aforesaid members being apertured to admit water into said tubular casing member.

2. A structure as specified in claim 1; said end members consisting of disks secured within the ends of said tubular casing member, said resilient strips extending between the peripheral edges of said disks and the inner periphery of said casing member, said strips contacting with said edges and said inner periphery and being thereby secured in place.

3. A structure as specified in claim 1; said end members consisting of disks fitting tightly into the ends of said tubular casing member, the peripheral edges of said disks having circumferentially spaced notches through which said strips extend.

4. A structure as specified in claim 1; said resilient strips being formed of metal and constituting additional positive electrodes galvanically cooperable with said negative electrode.

5. A structure as specified in claim 1; said end members having openings through which the ends of said negative electrode extend to points beyond the outer sides of said end members, said resilient strips being formed of metal and constituting additional positive electrodes galvanically cooperable with said negative electrode.

6. A self-energizing, electrolytic water correction device comprising a tubular metal casing member constituting a positive electrode, spaced resilient metal strips extending longitudinally through said casing member and spaced apart circumferentially thereof, said strips projecting beyond the ends of said casing member, end members secured to the ends of said casing member and having apertures through which said strips extend, said strips being secured between said end members and said casing member and being bowed outwardly at the outer sides of said end members to hold said strips against longitudinal sliding in said apertures and to provide spring fingers for supporting said device, and a negative electrode supported by said end members and extending longitudinally through said casing member for galvanic cooperation with the latter, at least one of the aforesaid members being apertured to admit water into said casing member.

THEODORE C. JONES.

REFERENCES CITED

The following references are of record in the file of this patent:

UNITED STATES PATENTS

| Number | Name | Date |
|---|---|---|
| 2,321,797 | Butler | June 15, 1943 |
| 2,301,546 | Brown | June 4, 1946 |
| 2,106,004 | Inglee | Jan. 18, 1938 |
| 840,335 | Hyle | Jan. 1, 1907 |
| 1,595,147 | Fox | Aug. 10, 1926 |
| 2,058,370 | Thompson | Oct. 20, 1936 |
| 2,358,981 | Lattner | Sept. 26, 1944 |

FOREIGN PATENTS

| Number | Country | Date |
|---|---|---|
| 311,882 | Great Britain | May 23, 1929 |